(12) United States Patent
Nguyen et al.

(10) Patent No.: US 9,767,168 B2
(45) Date of Patent: Sep. 19, 2017

(54) FEDERATION OPTIMIZATION USING ORDERED QUEUES

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

(*) Notice: Subject to any disclaimer, the term of this patent is extended or adjusted under 35 U.S.C. 154(b) by 302 days.

(21) Appl. No.: 14/550,084

(22) Filed: Nov. 21, 2014

(65) Prior Publication Data

US 2016/0147888 A1 May 26, 2016

(51) Int. Cl.
*G06F 17/30* (2006.01)

(52) U.S. Cl.
CPC .. *G06F 17/30545* (2013.01); *G06F 17/30477* (2013.01)

(58) Field of Classification Search
CPC ......... G06F 17/30867; G06F 17/30469; G06F 17/30663; G06F 17/3069; G06F 17/30545; G06F 17/30477
See application file for complete search history.

(56) References Cited

U.S. PATENT DOCUMENTS

| | | | |
|---|---|---|---|
| 6,026,391 A * | 2/2000 | Osborn | G06F 17/30306 |
| 7,448,022 B1 | 11/2008 | Ram et al. | |
| 8,380,787 B2 | 2/2013 | Anand et al. | |
| 8,504,523 B2 | 8/2013 | Starkey | |
| 8,527,502 B2 | 9/2013 | Doyle | |
| 8,538,985 B2 | 9/2013 | Betawadkar-Norwood et al. | |
| 8,838,584 B2 | 9/2014 | Rafsky et al. | |
| 2006/0155697 A1* | 7/2006 | Rosengard | G06F 17/3033 |
| 2006/0265362 A1* | 11/2006 | Bradford | G06F 17/30675 |
| 2009/0234799 A1* | 9/2009 | Betawadkar-Norwood | G06F 17/30545 |

FOREIGN PATENT DOCUMENTS

WO WO2014060050 A1 4/2014

OTHER PUBLICATIONS

Susanne Englert, Simon Harris, Holger Kache; Performance Enhancements in IBM WebSphere Federation Server V9.1, Part 1: Improve Performance of Federated Queries with New WebSphere Federation Server Capabilities; Dec. 7, 2006; 11 pages; http://www.ibm.com/developerworks/data/library/techarticle/dm-0612englert/.
Nagraj Alur, Miriam Goodwin, Hajime Kawada, Roger Midgette, DB Shenoy, Ron Warley; DB2 II: Performance Monitoring, Tuning and Capacity Planning Guide; Nov. 2004; 666 pages; https://www.google.co.in/url?sa=t&rct=j&q=&esrc=s&source=web&cd=10&cad=rja&uact=8&ved=0CEOQFjAJ&url=http%3A%2F%2Fconnections.sutol.cz%2Ffiles%2Fbasic%2Fanonymous%2Fapi%2Flibrary%20Fada6cb2c-1768-45ce-8boc-bcc289cd8b54%2Fdocument%2F4db5016f=572d-4ed2-89be-01881d95ca10%2Fmedia%2FDB2_performance_Monitoring_Tuning_and_Capacity-_Planning_Guide.pdf&ei=MiopVjybG8SfugSag4LQDA&usg=AFQjCNGCwWVOYcswZbak6NlurQNIDajtA&bvm-bv.76247554,d.c2E.
IBM OGSA-DAI Replication; 9 pages; http://homepages.inf.ed.ac.uk/ychen3/ibm_ogsadai/replication-technologies.html.

* cited by examiner

*Primary Examiner* — Apu Mofiz
*Assistant Examiner* — Husam T Samara
(74) *Attorney, Agent, or Firm* — Haynes & Boone, LLP

(57) ABSTRACT

Methods, systems, and computer program products for optimization of query processing in a data federation system using priority queuing techniques are provided. Priority queuing techniques may include generating a query vector corresponding to a query, comparing the query vector to historical query vectors to determine similarity, determining an expected processing time for the query based on the determined similarity, and inserting the query into a priority ordered queue at a particular position based on the expected processing time.

19 Claims, 5 Drawing Sheets

FEDERATION OPTIMIZATION USING ORDERED QUEUES

BACKGROUND

A data federation system is a type of database management system (DBMS). In a data federation system, a federation engine may be coupled to a plurality of data sources, from which the federation engine may access data. Queries for data stored in the plurality of data sources may be received by the federation engine from a plurality of clients. The federation engine may decompose each received query into sub-queries that are distributed to the plurality of data sources. The results of the sub-queries may then be aggregated into one or more result sets, also known as virtual views, by the data federation system. The data federation system may present the aggregated data from the virtual views to the clients in response to the client queries.

Data federation systems are complicated systems in which interactions that require high bandwidth occur every second. Significant batches of data may be frequently sent. Moreover, many data federation systems are deployed with the intention of the federation engine being the interface for all data of an organization. In addition, the federation engine may be the interface for data of external organizations. Accordingly, a data federation system may have high performance demands that contribute to lower quality of service (QoS). QoS in traditional federated database systems has been improved by techniques such as caching.

BRIEF SUMMARY

According to one embodiment a federation engine server communicatively coupled to one or more clients, a first data source and a second data source, comprises: one or more processors; a federated query queue comprising one or more federated queries; a first source query queue corresponding to the first data source, the first source query queue comprising one or more source queries; a data store comprising one or more historical query vectors; a data quality coordinator executable by the one or more processors to: generate a federated query vector based on a federated query received from a first client of the one or more clients; perform a first similarity measure between the federated query vector and at least one of the one or more historical query vectors to determine an estimated processing time of the federated query; set a priority of the federated query based on the estimated processing time of the federated query; based on the priority of the federated query, determine a position of the federated query in the federated query queue relative to at least one of the one or more federated queries; insert the federated query into the federated query queue at the position; generate a plurality of source queries corresponding to the federated query; generate a first source query vector based on a first source query of the plurality of source queries; perform a second similarity measure between the first source query vector and at least one of the one or more historical query vectors to determine an estimated processing time of the first source query; set a priority of the first source query based on the estimated processing time of the first source query; based on the priority of the first source query, determine a position of the first source query in the first source query queue relative to a position of at least one of the one or more source queries; insert the first source query into the first source query queue at the position; and retrieve a data result responsive to the first source query from the first data source in an order that is based upon the position of the first source query in the first source query queue.

According to another embodiment, a computer-implemented method for query processing, comprises: receiving a federated query from a client; generating a first source query and a second source query from the federated query; generating a first source query vector corresponding to the first source query wherein the first source query vector comprises components representing identified tables and columns in the first source query; generating a second source query vector corresponding to the second source query wherein the second source query vector comprises components representing identified tables and columns in the second source query; measuring similarity between the first source query vector and at least one of one or more historical query vectors to determine an estimated processing time of the first source query; measuring similarity between the second source query vector and at least one of the one or more historical query vectors to determine an estimated processing time of the second source query; setting a priority of the first source query and a priority of the second source query based respectively on the estimated processing time of the first source query and the estimated processing time of the second source query; inserting the first source query at a position in a first source query queue based on the priority of the first source query; inserting the second source query at a position in a second source query queue based on the priority of the second source query; removing the first source query from the first source query queue based on the position of the first source query in the first source query queue; and retrieving data results corresponding to the first source query.

According to yet another embodiment a non-transitory computer-readable medium comprises computer-readable instructions which, when executed by a processor, cause the processor to perform operations comprising: receiving a first federated query from a first client; removing the first federated query and a second federated query from a federated query queue; generating a first source query and a second source query based on the first federated query; generating a third source query based on the second federated query; estimating a processing time of the first source query and the second source query; assigning a priority to the first source query is based on both the (i) estimated processing time of the first query and (ii) the estimated processing time of the second query; and processing the first source query and the third source query in a source query queue in a priority-based order to retrieve data results corresponding to the first source query and the third source query.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
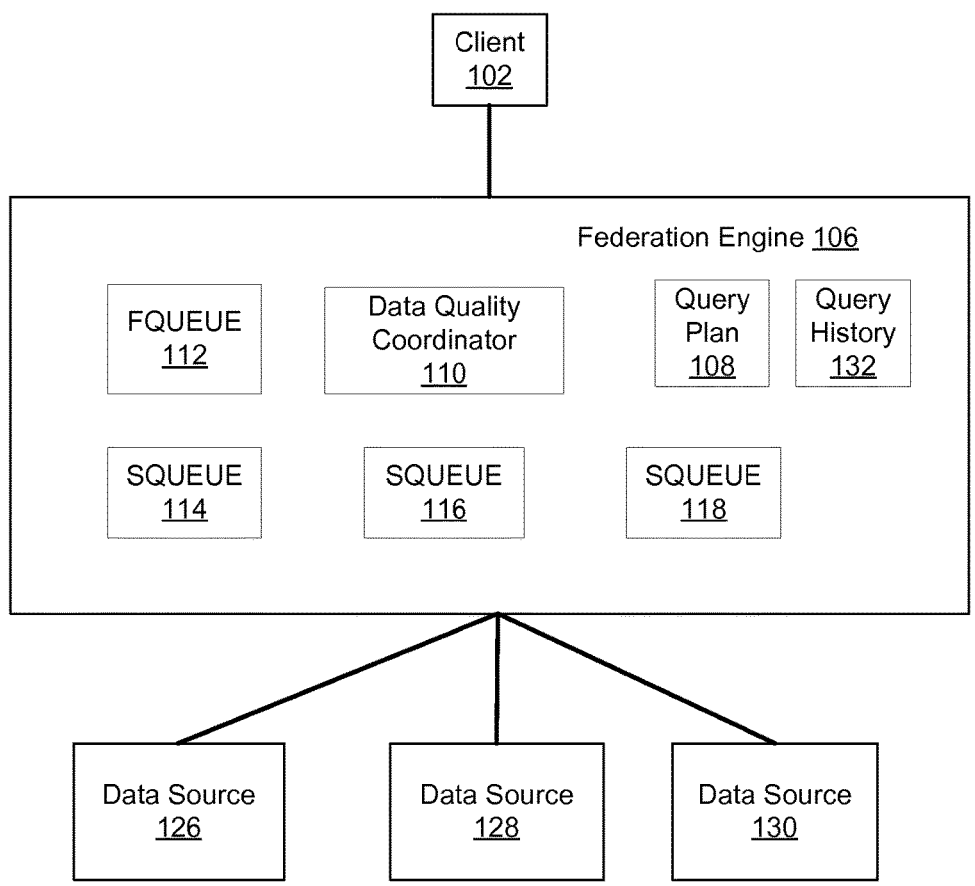
FIG. 1 is a block diagram illustrating a federated system architecture, in accordance with various examples of the present disclosure.

FIG. 1 illustrates an exemplary federated system architecture 100 in which examples of the present disclosure can be implemented. In federated system architecture 100, client 102, a first data source 126, a second data source 128, a third data source 130 and federation engine 106 are communicatively coupled via a network. The network may be a public network (e.g., the Internet), a private network (e.g., a local area network (LAN) or wide area network (WAN)), or a combination thereof. In an example, the network may include the Internet and/or one or more intranets, landline networks, wireless networks, and/or other appropriate types of communication networks. In an example, the network may comprise a wireless telecommunications network (e.g., cellular phone network) adapted to communicate with other communication networks, such as the Internet.

In an example, there may be one or more of each illustrated component (e.g., a plurality of clients, one data source, a plurality of data sources, and so forth).

Client 102 may be a computing device. The computing device may be a personal computer (PC), a tablet PC, a set-top box (STB), a Personal Digital Assistant (PDA), a cellular telephone, a web appliance, an enterprise server, a network router, switch or bridge, or any machine capable of executing a set of instructions (sequential or otherwise) that specify actions to be taken by that machine. Further, while one client is illustrated, the term client shall also be taken to include any collection of computing devices that individually or jointly execute a set (or multiple sets) of instructions to perform any one or more of the methodologies discussed herein.

Client 102 may run an operating system (OS) that manages hardware and software of a respective machine. The operating system may be any standard or proprietary OS. A browser may run on the OS of a client. The browser may be a web browser that can access content and services provided by federation engine 106. Further, other types of software applications (e.g., applications, mobile applications, "apps") running on client 102 may provide access to content and services of federation engine 106 without the use of a browser and/or without active human interaction.

In the present example, data sources 126, 128 and 130 may be any standard or proprietary data sources for storing data. For example, a data source may be an SQL-compliant database, a web service or a flat file. Data sources may be homogenous or heterogeneous (e.g., data source 126 may be an SQL-compliant database, data source 128 may be a web service and data source 130 may be a flat file).

Each data source 126, 128 and 130 may be stored in one or more computer readable storage media accessible by one or more computing devices. Examples of storage media include solid-state memories, optical media, and magnetic media, and so forth. A computing device may be a personal computer (PC), a tablet PC, a set-top box (STB), a Personal Digital Assistant (PDA), a cellular telephone, a web appliance, an enterprise server, a network router, switch or bridge, or any machine capable of executing a set of instructions (sequential or otherwise) that specify actions to be taken by that machine.

Each data source computing device may be structured with one or more applications that interact with the federation engine and the data source, such as by receiving queries from federation engine 106, retrieving results from the data source and returning the results to the query to federation engine 106. The one or more applications may comprise a database management system. In one example, a Java Database Connectivity (JDBC) API is implemented on a data source computing device, in order for federation engine 106 to communicate with the data source using the API.

Federation engine 106 is communicatively coupled to data sources (e.g., a first data source 126, a second data source 128 and a third data source 130) and clients (e.g., client 102). Federation engine 106 is structured to receive one or more federated queries from clients, parse the federated queries into source queries (e.g., a first source query for a first data source 126, a second source query for a second data source 126 and a third source query for a third data source query 130), retrieve results for each source query from the data sources, aggregate the results and present the aggregated results to client using one or more federated views (i.e., "virtual views").

In the present example, federation engine 106 may be a database management system software for processing queries. Federation engine 106 may be stored in one or more computer readable storage media and executed by one or more computing devices that individually or jointly execute a set (or multiple sets) of instructions to perform any one or more of the methodologies discussed herein. Examples of computing devices include enterprise servers, personal computers, laptop computers, any machines capable of executing a set of instructions (sequential or otherwise) that specify actions to be taken by that machine, and so forth.

In the present example, federation engine 106 includes a data quality coordinator 110 that is communicatively coupled with query plan 108, query history 132, and data structures for storing queries: FQUEUE 112, SQUEUE 114, SQUEUE 116 and SQUEUE 118.

Data quality coordinator 110 is structured to process federated queries that are received from a client 102. Federated queries may be received and inserted in a priority ordered queue, FQUEUE 112, by data quality coordinator 110 while the federated queries are waiting to be processed (to generate source queries from the federated queries). Similarly, source queries that are generated from federated queries may be inserted into priority ordered queues, SQUEUE 114, SQUEUE 116 and SQUEUE 118, by data coordinator 110 while the source queries are waiting to be sent to data sources 126, 128 and 130. In this example the data structures for storing queries are queues, however, in another example each data structure may be a different type of data structure such as a stack or linked list.

In the present example, FQUEUE 112 is structured to store federated queries. Federated queries are ordered in FQUEUE 112 by priority and removed from FQUEUE 112 according to that priority.

In the present example, federation engine 106 includes query plan 108 that is structured to include instructions for analyzing and parsing a federated query to generate source queries for data sources 126, 128 and 130, and aggregating the results that are retrieved from the data sources to assemble a federated query result that may be returned to client 102 via a federated view.

Data quality coordinator 110 is structured to store each generated source query in the SQUEUE that corresponds to the destination data source of the source query. In this example, SQUEUE 114 stores source queries for data source 126. SQUEUE 116 stores source queries for data source 128 and SQUEUE 118 stores source queries for data source 130. Source queries are ordered in their respective SQUEUE by priority and removed from the respective SQUEUE according to that priority. Data quality coordinator 110 is structured to remove source queries from SQUEUEs 114, 116 and 118 in parallel such that data sources 126, 128 and 130 may process source queries concurrently to determine source query results that are returned to federation engine 106.

In the present example, data quality coordinator 110 is structured to measure performance data associated with federated and source queries. Query history 132 is structured as a data store, such as a database, that stores the result of each performance measurement and a corresponding vector that represents the query that was measured. In this example, a performance measurement result for a query is the processing time required to complete the query. In other examples, other performance measurements for queries may be determined and stored in addition to or instead of processing time, such as bandwidth, data storage requirements, processor utilization, and so forth.

Federated system 100 is structured to ensure high QoS by processing federated queries and source queries in an optimal order to improve the functioning of the client 102 computing device, the federated engine 106 computing device, and the computing devices associated with data sources 126, 128 and 130. By processing the queries in an optimal order, federated engine 106 retrieves query results more efficiently from data sources 126, 128 and 130 and is able to return query results to client 102 at a faster rate.

Figure 2:
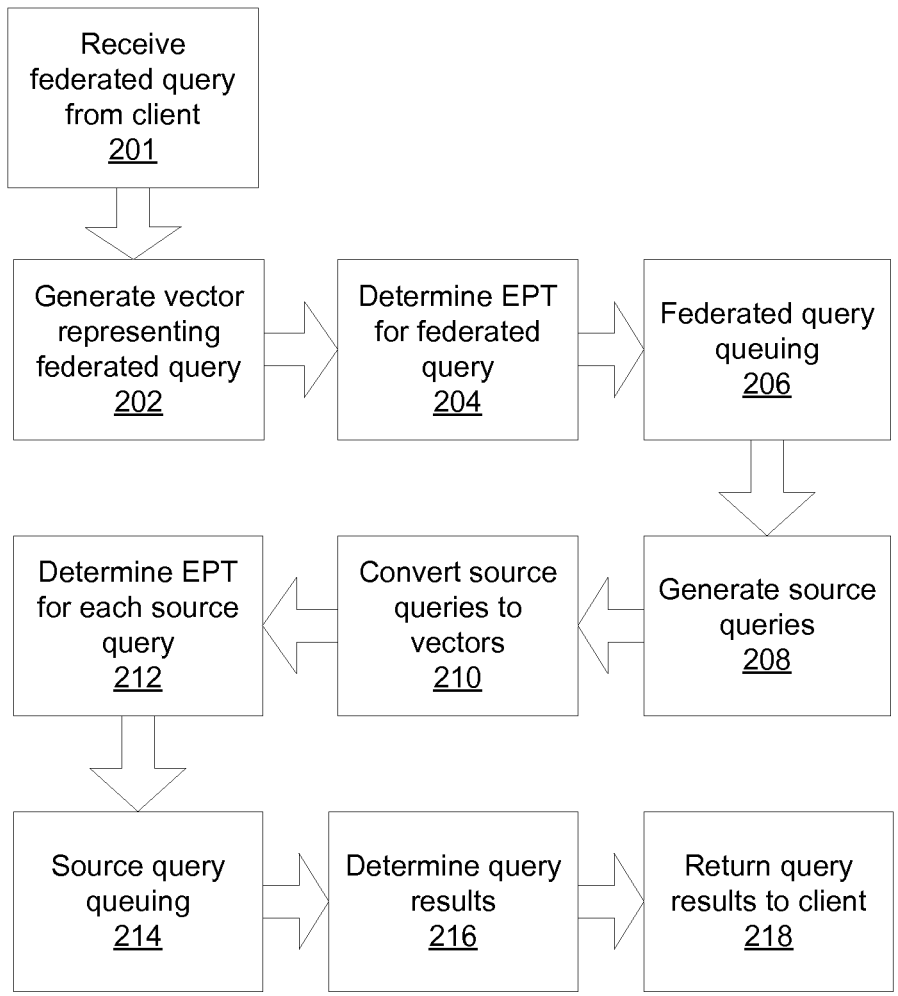
FIG. 2 is a flow diagram illustrating query processing, according to an example of the present disclosure.

FIG. 2 is a flow diagram illustrating query processing, according to an example of the present disclosure. Method 200 may be performed by processing logic that may comprise hardware (circuitry, dedicated logic, programmable logic, microcode, etc.), software (such as instructions run on a computer system, specialized hardware, dedicated machine, or processing device), firmware, or a combination thereof.

Method 200 begins at block 201. At block 201, a federated query is received from a client.

At block 202 a vector is generated that represents the federated query received from the client. In the present example, the federated query is an SQL query.

In this example, given an SQL query in format "SELECT c1, . . . , cN FROM t1, . . . , tN, WHERE cond1, . . . , condN" the vector is constructed using three component sets, numbered 1, 2 and 3, below.

1) The first component of the vector is set to a count of the number of columns identified in the SELECT clause (c1, . . . , cN).

2) There is a component of the vector corresponding to each federated table in the federated system. The set of federated tables in the federated system may comprise all of the data source tables that are accessible to the federation engine for querying data. The component of the vector for each table identified in the FROM clause of the query (t1, . . . , tN) is set to the number of federated tables in the federated system. If a table is not identified in the FROM clause, then the corresponding component of the vector for that table is set to 0.

3) There is a component of the vector corresponding to each federated column in the federated system. The set of federated columns in the federated system may comprise all of the columns in the federated tables. The component of the vector for each column identified in the WHERE clause of the query (cond1, . . . condN) is set to the number of columns in the federated tables in the federated system. If a column is not identified in the WHERE clause, then the corresponding component of the vector for that column is set to 0.

EXAMPLE 1

There are two federated tables in the federated system. The first table, t1, includes columns c1 and c2. The second table, t2, includes columns c3 and c4. Accordingly, there are four total columns in the federated tables in the federate system.

In this example, a vector is generated for the following SQL query: "SELECT c1 FROM t1, WHERE c1='test'".

According to this example, the first component of the vector is set to the total number of columns identified in the SELECT clause. Since there is one column identified in the SELECT clause (c1), this first component of the vector is set to 1.

The second and third components in the vector correspond to the federated tables t1 and t2. The second component of the vector corresponds to t1. Since t1 is identified in the FROM clause of the query, the second component is set to the number of tables (2). The third component of the vector corresponds to t2. Since t2 is not identified in the FROM clause of the query, the third component is set to 0.

The fourth, fifth, sixth and seventh components in the vector correspond to the federated columns c1, c2, c3 and c4. The fourth component of the vector corresponds to c1. Since c1 is identified in the WHERE clause of the query, the fourth component is set to the number of columns (4). The fifth, sixth and seventh components of the vector are set to 0 because c2, c3 and c4 are not identified in the WHERE clause of the query.

Accordingly, the following vector is generated, having the following components: (1, 2, 0, 4, 0, 0, 0).

In another example, the components of the vector may be ordered in various other arrangements, such as grouping the components corresponding to columns prior to the components corresponding to tables. In yet another example, a grouping of components may be omitted, such as omitting the components corresponding to tables.

At block 204, an expected processing time (EPT) is determined for the federated query. In the present example, a query history stores historical queries and the query performance measurements for those historical queries. Each historical query is stored in vector format. As the data quality coordinator receives new queries, the data quality coordinator analyzes those queries to update the query history with additional historical query vectors and performance measurements corresponding to those historical query vectors.

In the present example, after a vector is generated for the federated query, the vector is input into a query of the query history, to determine whether there are historical queries that are similar to the input query vector. Similarity between the input vector and the historical query vectors may be determined using a cosine similarity calculation. The similarity measurement output is one or more historical queries that are determined to be the closest matches to the input vector. If there is one match, the performance measurement of the match (in this example, a processing time) is assigned to the federated query as the EPT for the federated query. If there is more than one match, the processing times for the matches may be averaged to determine the EPT for the federated query.

In the present example, if no similar historical queries are determined, for example if the query history is empty, then the EPT for a query may be set to 0. In another example, if no similar historical queries are determined, the EPT may be set to a user-configured constant. In yet another example, if no similar historical queries are determined, the EPT may be set to an average of the EPTs of the historical queries.

In block 206, the data quality coordinator determines whether there is a federated query overload. If there is no overload, then the federated query is processed in block 208 to generate source queries from the federate query. If there is a federated query overload, then the federated query is placed into a federated query queue (FQUEUE). In another example, all federated queries may be queued without an overload determination.

In the present example, the federation engine has a limit on the number of threads that may be executing concurrently. Accordingly, when the data quality coordinator attempts to submit a federated query for processing, and there are no available threads, the federated query is rejected, and the data quality coordinator instead places the rejected federated query into the FQUEUE. FQUEUE ordering is based on the policy of prioritizing federated queries with the lowest EPT. The FQUEUE is used by the data quality coordinator to store the federated queries, order the queries based on priority, remove the federated query with the highest priority and resubmit the removed federated query for processing (to generate source queries for the federated query) as an additional thread becomes available. The ordering of the FQUEUE is discussed further in relation to FIG. 3.

At block 208, an additional thread has become available (i.e., there is no longer a federation engine overload) and a federated query is removed from the queue. The data quality coordinator analyzes and parses the federated query according to a query plan, to generate one or more source queries corresponding to the federated query. In one example, the one or more source queries are generated by decomposing the federated query. Each generated source query corresponds to a data source. For example, a first source query may be a query that is to be sent to a first data source.

At block 210, a vector is generated for each source query. The source query vectors may be generated in the same manner as the vectors generated for the federated query. For example, a source query vector generated for a source query may include a first component corresponding to a count of the number of columns identified in the SELECT clause of the source query, a next group of components corresponding to the federated tables, and a next group of components corresponding to the federated columns.

In another example, one or more of the vector components corresponding to the federated tables and the federated columns may instead correspond to the federated tables and federated columns located in the data source targeted by the particular source query, rather than the federated tables and federated columns of the federated system. For example, federated tables and federated columns not contained in the data source may be omitted from the vector components.

At block 212, an EPT is determined for each source query. The EPT for each source query may be determined in the same manner as the EPT is determined for the federated query. For example, a source query vector may be input as a query of a query history to determine similar vectors based on a cosine similarity. Similar historical queries may be determined and the processing times of those queries may be averaged to calculate an EPT for the source query.

In the present example, each data source may be configured with a maximum number of connections to accept. When the maximum number of connections is reached, additional connections may be blocked, indicating to the data quality coordinator that the data source is overloaded. In another example, all source queries may be queued without an overload determination.

At block 214, the data quality coordinator attempts to submit each source query to a data source. If the data source indicates that it is overloaded, then the data quality coordinator places the source query instead into a source query queue (SQUEUE) that is associated with the data source. Each data source is associated with its own SQUEUE. For example, source queries for a first data source may be inserted into a first SQUEUE and source queries for a second data source may be inserted into a second SQUEUE.

In this example, SQUEUE ordering is based on the policy of prioritizing queries towards a goal of completing the source queries relating to the same federated query at the same time. For example, if three source queries are generated from a federated query, the goal is for the three source queries to be able to execute in parallel and complete execution at the same time.

At block 216, the source queries are sent to data sources according to the priority of the source queries in the SQUEUEs. The data sources process received source queries to determine query results and the query results are returned to the federation engine.

At block 218, the federation engine aggregates the query results of the source queries corresponding to each federated query, and returns an aggregated query result to the client that corresponds to the client's query. Accordingly, the query processing of the federation engine and data sources is optimized by ordering the processing of federated queries and source queries such that the source queries corresponding to each federated query are efficiently processed in parallel to complete at the same time or near the same time.

Figure 3:
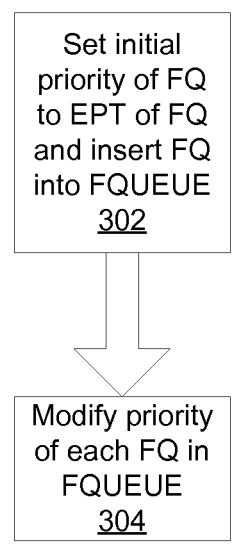
FIG. 3 is a flow diagram illustrating federated query queue ordering, according to an example of the present disclosure.

FIG. 3 is a flow diagram illustrating federated query queue ordering, according to an example of the present disclosure. The method 300 may be performed by processing logic that may comprise hardware (e.g., circuitry, dedicated logic, programmable logic, microcode), software (such as instructions run on a computer system, specialized hardware, dedicated machine, or processing device), firmware, or a combination thereof.

At block 302, the initial priority of the federated query is set to the determined EPT for the federated query. The federated query is inserted into the queue at a position corresponding to its initial priority. In this example, FQUEUE ordering is based on the policy of processing the queries with the lowest EPT first. Accordingly, the federated query is inserted into a position in the FQUEUE according to its priority relative to the priorities of the other federated queries. For example, if the priority of a first federated query is 10, and there is a second federated query in the FQUEUE with a priority of 5, then the first federated query is inserted in the FQUEUE after the second federated query such that the first federated query is removed from the FQUEUE after the second federated query is removed from the FQUEUE.

In another example, the FQUEUE is prioritized in other ways, such as by assigning priority to queries based on the application or client that submitted the query.

At block 304, in order to ensure that all federated queries are processed, a time duration may be pre-configured, such as every millisecond that elapses, the federated queries in the FQUEUE receive a priority adjustment, in that the priority of each federated query in the FQUEUE is increased. An increase of a priority modifies the priority in the direction of 0, with 0 being the highest priority. A priority of 0 indicates that the federated query is closer to being removed from the FQUEUE and processed than federated queries with a priority that is above 0 (e.g., a federated query with a priority of 0 is removed from the FQUEUE before a federated query with a priority of 1).

In the present example, a constant such as 1 may be subtracted from the priority of each federated query for each millisecond that elapses. In another example, the constant may be a different number other than 1. In yet another example, the priority of each federated query may increase over time based on a user-configured number. In a further example, the priority of each federated query may increase over time based on a number calculated from the EPTs of the federated queries in the FQUEUE.

By increasing the priority of each federated query over time, the data quality coordinator ensures that all federated queries will be processed. In this example, 0 is the highest priority and a priority of a federated query will not be reduced below 0. In another example, instead of 0 representing the highest priority, some other number may be used as the highest priority and the priority adjustment may adjust the priority of each federated query in the FQUEUE toward the highest priority.

Figure 4:
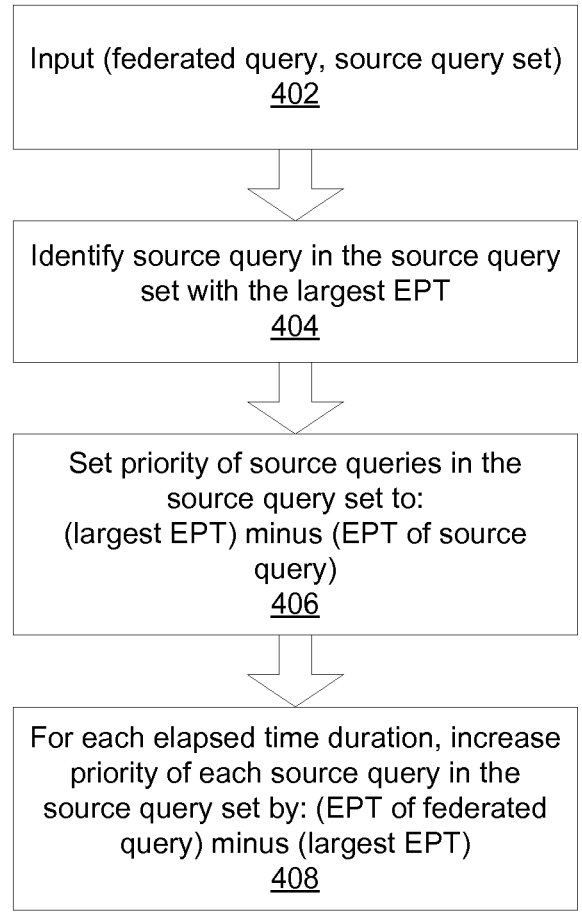
FIG. 4 is a flow diagram illustrating source query queue ordering, according to an example of the present disclosure.

FIG. 4 is a flow diagram illustrating source query queue ordering, according to another example of the present disclosure. The method 400 may be performed by processing logic that may comprise hardware (e.g., circuitry, dedicated logic, programmable logic, microcode), software (such as instructions run on a computer system, specialized hardware, dedicated machine, or processing device), firmware, or a combination thereof.

At block 402, an input of a federated query and the source queries in the source query set corresponding to the federated query are processed by the data quality coordinator. In the present example, the EPT of each source query in the source query set has been determined, such as by a cosine similarity measure between each source query vector and the historical query vectors stored in the query history.

At block 404, the source query in the source query set with the largest EPT is identified.

For example, if the source query set has a first source query for a first data source, a second source query for a second data source and a third source query for a third data source, with EPTs of 5 ms, 10 ms and 20 ms, respectively, the third source query with the EPT of 20 ms is identified as having the largest EPT.

At block 406, each source query in the source query set is assigned a priority by subtracting the EPT of the source query having the largest EPT of the source query set.

As according the previous example, the priority of the first source query is set to 15 (i.e., 20-5) and the first source query is inserted into the first SQUEUE, which corresponds to the first data source. The priority of the second source query is set to 10 (i.e., 20-10), and the second source query is inserted into the second SQUEUE, which corresponds to the second data source. The priority of the third source query is set to 0 (i.e., 20-20), and the third source query is inserted into the third SQUEUE, which corresponds to the third data source.

The adjusting of the priorities of the source queries in the source query set (for example by giving the first source query a priority of 15 rather than 5) is designed to allow all of the source queries in the source query set to complete at or near the same time when the source queries are executed in parallel. By adjusting the priority of the first and the second source queries, other source queries are optimized by allowing those other source queries to be inserted ahead of the first and second queries in the SQUEUEs to allow the optimized source queries to be removed from SQUEUEs at an earlier time than the adjusted queries. For example, if the first SQUEUE contains the first source query that is inserted with a priority of 15, a fourth query with a priority of 3 may be inserted ahead of the first source query. That is, the fourth query with the priority of 3 is processed before the first source query with the priority of 15, while still allowing the first source query to complete at or near the same time as the second and third source queries.

In another example, in order to further prioritize source queries with low EPTs, instead of subtracting the EPT of the source query from the largest EPT of the source query set to determine priority of the source query, the priority of the source query may be set to the EPT of the source query. For example, if the source queries have EPTs of 5 ms, 10 ms and 20 ms, the priorities of the source queries may be set to 5, 10 and 20, respectively. In yet another example, as a balance between the earlier examples, the EPTs of the source queries may be subtracted from the largest EPT of the source query set with the exception of the source query with the largest EPT. For example, if the source queries have EPTs of 5 ms, 10 ms and 20 ms, the priorities of the source queries may be set to 15, 10 and 20, respectively.

At block 408, in order to ensure that all source queries are processed, a time duration may be pre-configured, such that the source queries in the SQUEUE receive a priority adjustment based on the elapsing of the time duration. For example, the pre-configured time duration may be 1 ms. Every 1 ms that each source query is in the SQUEUE the priority of each source query may be increased. In the present example, each source query priority is increased by a number that is equal to: the EPT of the federated query to which the source query corresponds, minus the largest EPT in the source query set. As according to the previous example, the largest EPT of the source query set is 20 ms. If, for example, an EPT for the federated query is determined to be 25 ms, then the priority increase amount is 5 (i.e., 25-20). With each millisecond that elapses, the priority of each of the first source query, the second source query, and the third source query is increased by 5 ms. By increasing the priority of each source query over time, the data quality coordinator ensures that all source queries will be processed. In yet another example, the priority of each source query may increase over time based on a user-configured number.

In the present example, an increase of a priority modifies the priority in the direction of 0, with 0 being the highest priority. A priority of 0 indicates that the source query is closer to being removed from the SQUEUE and processed than source queries with a priority that is above 0 (e.g., a source query with a priority of 0 is removed from the SQUEUE before a source query with a priority of 1). In this example, 0 is the highest priority and a priority of a source query will not be reduced below 0. In another example, instead of 0 representing the highest priority, some other number may be used as the highest priority and the priority adjustment may adjust the priority of each source query in an SQUEUE toward the highest priority.

Figure 5:
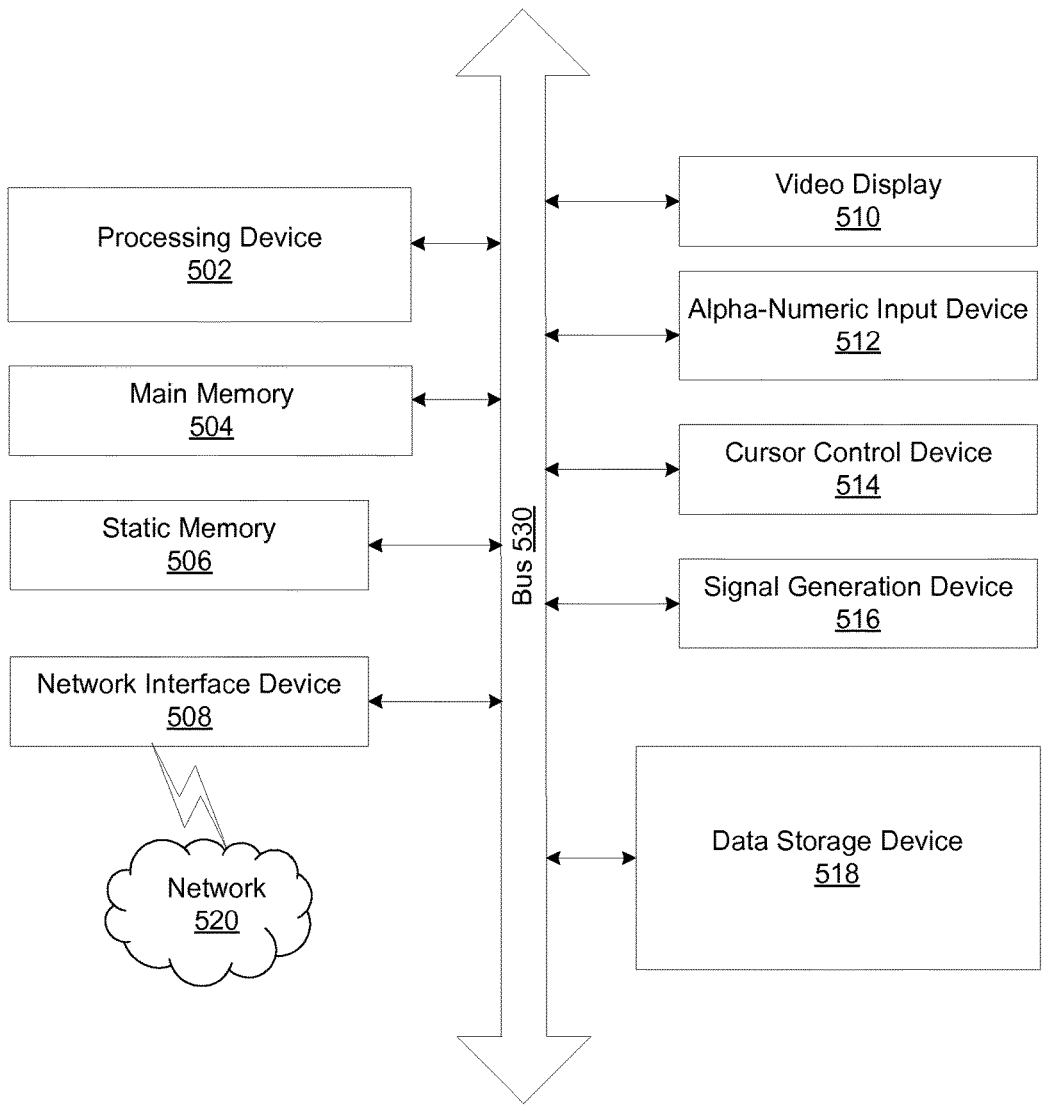
FIG. 5 is a block diagram illustrating an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an enterprise server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A federation engine server comprising:
a non-transitory memory; and
one or more processors to execute instructions to perform operations comprising:
generating a federated query vector based on a federated query received from a client;
performing a first similarity measure between the federated query vector and one or more historical query vectors to determine an estimated processing time of the federated query;
inserting the federated query into a position in a federated queue based on the estimated processing time of the federated query;
adjusting a priority of the federated query in the federated queue by a pre-configured amount when a pre-configured time duration elapses;
generating a plurality of source queries corresponding to the federated query;
generating a first source query vector based on a first source query of the plurality of source queries;
performing a second similarity measure between the first source query vector and the one or more historical query vectors to determine an estimated processing time of the first source query;
inserting the first source query into a position in a first source query queue based on the estimated processing time of the first source query; and
retrieving a data result responsive to the first source query from a first data source in an order that is based upon the position of the first source query in the first source query queue.

2. The federated system of claim 1, the operations further comprising:
generating a second source query vector based on a second source query of the plurality of source queries;
performing a third similarity measure between the second source query vector and the one or more historical source query vectors to determine an estimated processing time of the second source query; and
inserting the second source query into a position in a second source query queue based on the estimated processing time of the second source query.

3. The federated system of claim 2, the operations further comprising:
determining that the estimated processing time of the first source query is greater than the estimated processing time of the second source query; and
setting the priority of the second source query to the estimated processing time of the first source query minus the estimated processing time of the second source query.

4. The federated system of claim 1, wherein at least one of (i) the first similarity measure and (ii) the second similarity measure is a cosine similarity measure.

5. The federated system of claim 1, wherein at least one of the federated query and the first source query is an SQL query.

6. The federated system of claim 1, wherein (i) the federated query vector comprises components representing tables and columns identified in the federated query and (ii) the first source query vector comprises components representing tables and columns identified the first source query.

7. A computer-implemented method for query processing, comprising:
receiving a federated query from a client;
generating, from the federated query, a first source query and a second source query;
generating a first source query vector corresponding to the first source query, wherein the first source query vector comprises components representing identified tables and columns in the first source query;
measuring similarity between the first source query vector and at least one of one or more historical query vectors to determine an estimated processing time of the first source query;
setting a priority of the first source query based on an amount that corresponds to the estimated processing time of the first source query, wherein the estimated processing time of the first source query is modified by at least one of: (1) an estimated processing time of the second source query or (2) an estimated processing time of the federated query;
inserting the first source query at a position in a first source query queue based on the priority of the first source query;
removing the first source query from the first source query queue based on the position of the first source query in the first source query queue; and
retrieving data results corresponding to the first source query.

8. The method of claim 7, wherein measuring similarity comprises measuring cosine similarity.

9. The method of claim 7 further comprising, if a plurality of the one or more historical query vectors are determined to be similar to the first source query vector, averaging estimated processing times corresponding to the plurality of the one or more historical queries to determine the estimated processing time of the first source query.

10. The method of claim 7, wherein a first component of the first source query vector is a count of the number of columns identified in the first source query.

11. The method of claim 7, further comprising:
determining an actual processing time for at least one of: the federated query$_1$ the first source query, or the second source query; and
storing the actual processing time and a vector in a historical query data store.

12. A non-transitory computer-readable medium comprising computer-readable instructions which, when executed by a processor, cause the processor to perform operations comprising:
receiving a first federated query from a client;
storing the first federated query in a federated query queue;
removing, from the federated query queue, the first federated query and a second federated query;
generating, based on the first federated query, a first source query and a second source query;
generating a third source query based on the second federated query;
estimating a processing time of the first source query and the second source query;
assigning a priority to the first source query based on an amount that corresponds to the estimated processing time of the first source query, wherein the estimated processing time of the first source query is adjusted by at least one of: (1) the estimated processing time of the second source query or (2) an estimated processing time of the federated query; and processing the first source query and the third source query in a source query queue in a priority-based order to retrieve data results corresponding to the first source query and the third source query, wherein the source query queue corresponds to a particular data source, and wherein the source query queue is a different queue than the federated query queue.

13. The medium of claim 12, wherein estimating the processing time of the first source query comprises generating a vector corresponding to the first source query.

14. The medium of claim 13, wherein the vector comprises components representing identified tables and columns in the first source query.

15. The medium of claim 13, the processor further to:
determine one or more historical query vectors similar to the vector based on a cosine similarity measurement.

16. The medium of claim 15, wherein one or more estimated processing times are associated with the one or more historical query vectors.

17. The medium of claim 16, wherein estimating the processing time of the first source query comprises averaging the one or more estimated processing times.

18. The method of claim 7, wherein modifying the estimated processing time of the first source query by the estimated processing time of the second source query comprises subtracting the estimated processing time of the second source query from the estimated processing time of the first source query.

19. The method of claim 7, wherein modifying the estimated processing time of the first source query by the estimated processing time of the federated query comprises subtracting, from the estimated processing time of the first source query, the difference between the estimated processing time of the first source query and the estimated processing time of the federated query.

* * * * *